Jan. 18, 1927. 1,614,808

A. SUEK ET AL

WEEDER

Filed March 10, 1926

Inventors
Anton Suek and
John Henry Thieman
Fetherstonhaugh & Co.
Attys.

Patented Jan. 18, 1927.

1,614,808

UNITED STATES PATENT OFFICE.

ANTON SUEK, OF MUENSTER, AND JOHN HENRY THIEMAN, OF HUMBOLDT, SASKATCHEWAN, CANADA.

WEEDER.

Application filed March 10, 1926. Serial No. 93,746.

Our invention relates to improvements in weeders, and the object of the invention is to devise a weeder which may be readily cleared from the weeds from time to time and which will therefore provide a weeder which will not become so clogged as to prevent efficient operation, and it consists essentially of the arrangement and construction of parts as hereinafter more particularly explained.

In the drawings like characters of reference indicate corresponding parts in each figure.

Figure 1:
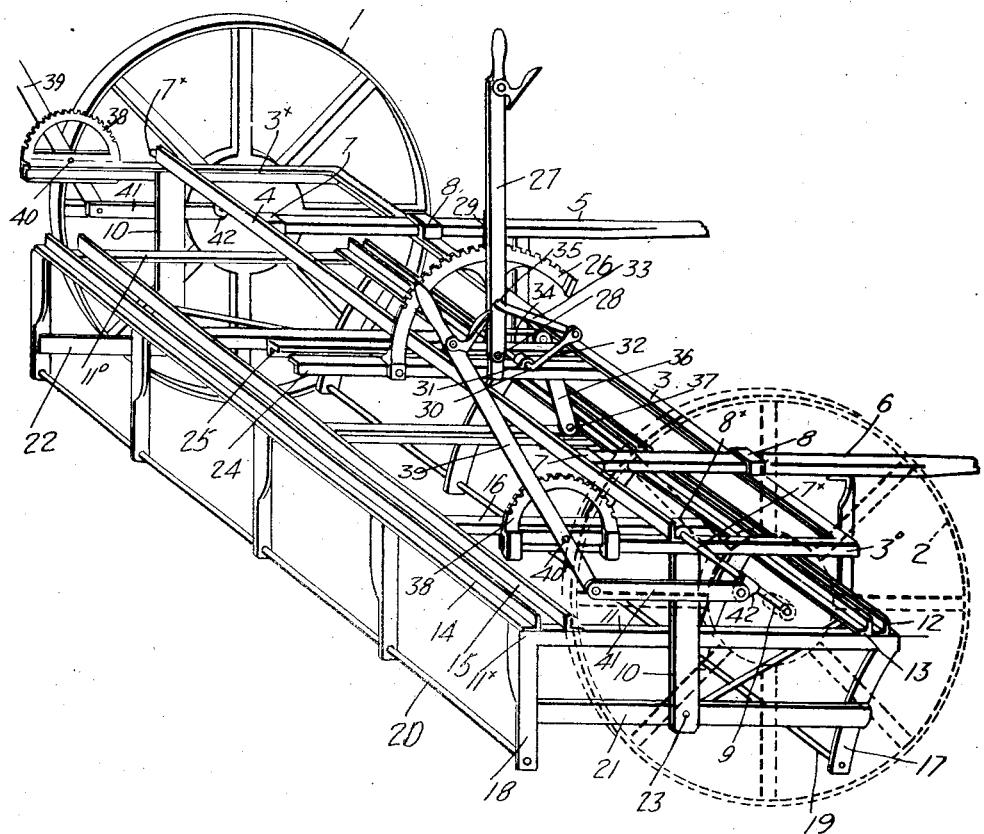
Fig. 1 is a perspective view of our weeder.
Figure 2:
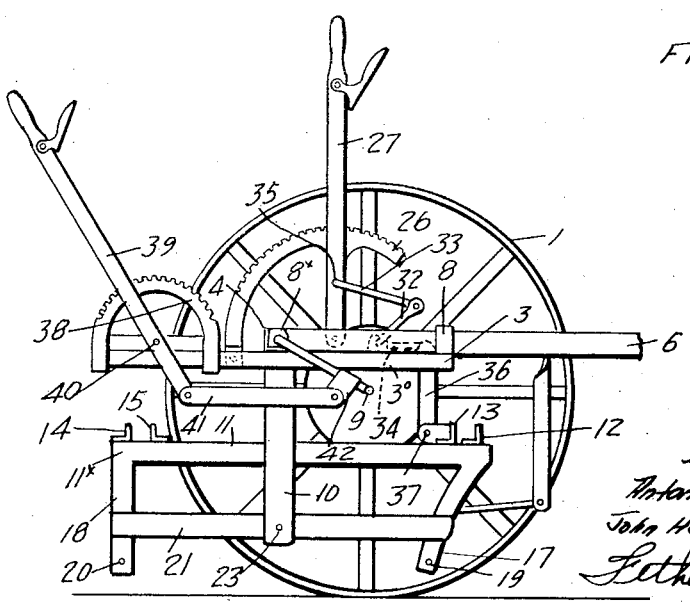
Fig. 2 is an end elevation of our weeder with one of the carrying wheels removed.

1 and 2 are the carrying wheels. 3 is a main frame broad U-shaped in form and provided intermediately of the length of the side arms $3^x$ and $3^o$ with a longitudinally extending bar 4. 5 and 6 are the shafts of our weeder bracketed at 7 and 8 to the bar 4 and front bar of the frame 3. $7^x$ are crank axles journalled at their upper ends in brackets $8^x$ carried by the bar 4 in proximity to each end thereof and revolvably carrying at their lower out turned ends as indicated at 9 the carrier wheels 1 and 2.

10 are hanger members depending from the side bars $3^x$ and $3^o$ and rigidly secured thereto. 11 is a frame comprising the end bars $11^x$ and $11^o$, the front bars 12 and 13 and the rear bars 14 and 15 connecting the end bars $11^x$ and $11^o$ together and the intermediate bars 16 extending between the bars 12 and 13 and 14 and 15 at suitably spaced distances apart and parallel with the end bars $11^x$ and $11^o$.

The front ends of the bars $11^x$ and $11^o$ and 16 are down turned as indicated at 17 and the rear ends as indicated at 18.

19 is a rod extending through the down turned ends 17, and 20 is a rod extending through the down turned ends 18. 21 and 22 are supplemental end bars secured to the down turned portions 17 and 18 intermediate of their height. 23 is a pivot pin extending through each hanger member 10 and the corresponding supplemental end bars 21 and 22.

By this means the frame 11 is tiltably mounted so that the rods 19 or 20 may be alternately carried downward into engagement with the ground.

In order to tilt the frame 11 we provide the following mechanism.

24 and 25 are parallel bars secured to the bar 4 and front bar of the frame 3 intermediate of the length thereof and upon which is carried a quadrant rack 26. 27 is a lever pivoted at 28 and provided with a locking dog 29 of common construction coacting with the rack 26. 30 is a rocking rod journalled at 31 on the bars 24 and 25 and provided with arms 32 and 34, the arm 32 being connected by a link 33 pivotally connected at its opposite end to the lever 27 at 35. The other arm 34 is connected by a link 36 to the frame 11 as indicated at 37.

By swinging the lever 27 the arm 32 is swung up or down to carry the arm 34 in a corresponding direction and thereby raise or lower the front portion of the frame 11 swinging it upon the pivot pins 23 and thereby carrying the rods 19 and 20 alternately into engagement with the ground.

In order to adjust the machine to the ground level we have provided racks 38 secured to each of the end bars $3^x$ and $3^o$. Each lever 39 is connected at its lower end by a link 41 to a lug 42 carried by the arm.

It will thus be seen by swinging one or other of the levers 39 that the axle arms $7^x$ may be swung up or down so as to lift or lower the corresponding end of the frame so that the machine will conform to the slant of the ground surface.

In operating our device the lever 27 is swung so that either the rod 19 or 20 is carried into engagement with the ground so as to travel through the comparatively soft earth engaging the weed roots and lifting them onto the ground surface so as to leave them exposed. During this operation the rod is liable to become clogged with weeds or other rubbish and when this takes place all it is necessary to do is to swing the lever 27 so that the rod 19 or 20 engaging the ground is lifted clear of the ground so as to permit the weeds and rubbish dropping therefrom and the other rod is simultaneously carried into engagement with the ground to perform the weed operation.

From this description it will be seen that we have devised a very simple machine for weeding land surface which will be readily cleared of weeds whenever desired and which will therefore perform its weeding operation efficiently at all times.

What we claim as our invention is:

A weeder comprising a main frame, carrier wheels at each end of the frame, a hanger member depending from each end of the frame, a supplemental frame comprising transverse bar members extending between the carrier wheels, substantially inverted U-shaped members connecting the bar members together at suitably spaced distances apart, rods extending through each set of arms of the inverted U-members, a bar member extending across each outermost U-member and pivotally connected intermediate of its length to each of the hanger members, an operating lever, and means actuated thereby for tilting the supplemental frame to force the rods alternately beneath the surface of the ground.

ANTON SUEK.
JOHN HENRY THIEMAN.